Feb. 21, 1928.
R. SHEPHEARD
1,659,668
GRINDING MILL
Filed Aug. 7, 1926    2 Sheets-Sheet 2
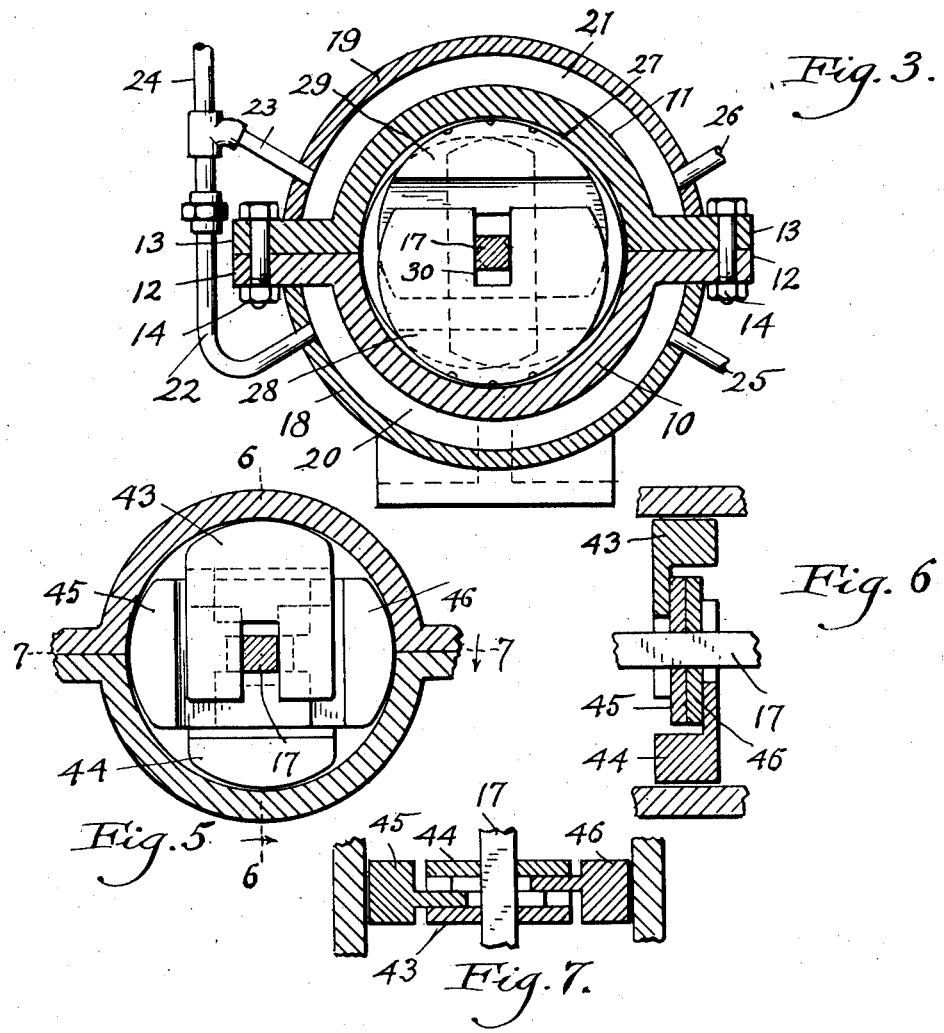
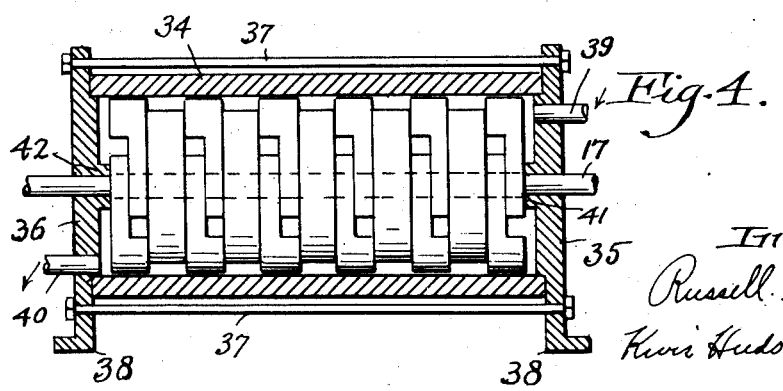

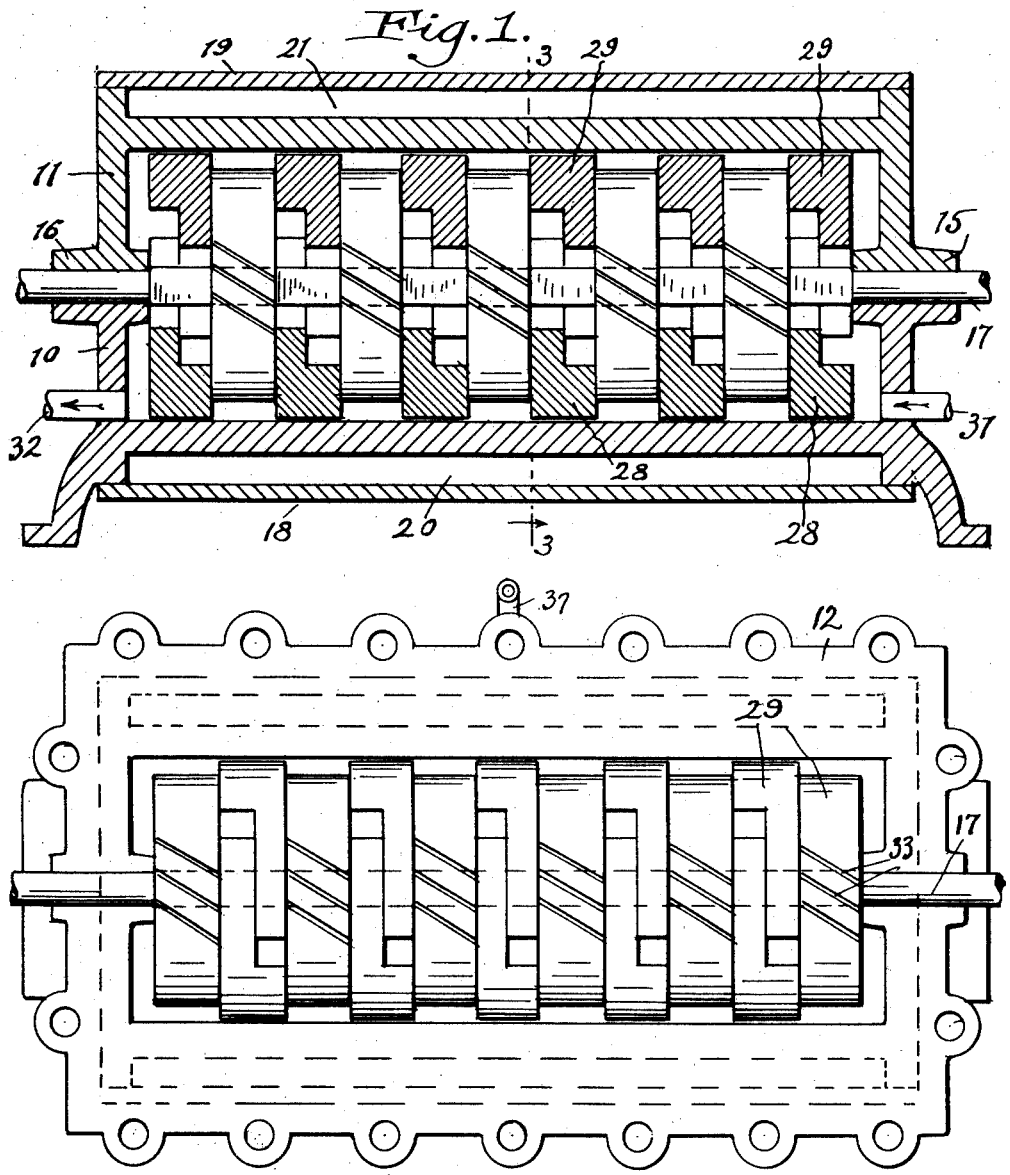

Patented Feb. 21, 1928.

1,659,668

UNITED STATES PATENT OFFICE.

RUSSELL SHEPHEARD, OF CLEVELAND, OHIO.

GRINDING MILL.

Application filed August 7, 1926. Serial No. 127,804.

This invention relates to grinding mills and more particularly to mills especially adapted for grinding pigments and paint materials.

It is one of the objects of the invention to provide an improved form of grinding mill that will be adapted to thoroughly disintegrate the material, to be ground, and produce a finished product that will be of uniform fineness.

It is a further object of the invention to provide a mill, of a type referred to, that will be capable of operating efficiently, on a commercial scale, and grind the materials at a minimum cost.

Other objects of the invention and the features of novelty will be apparent from the following description taken in connection with the accompanying drawings, of which:

Fig. 1 is a longitudinal section through a mill embodying my invention, the section being taken in a vertical plane;

Fig. 2 is a horizontal section through the same;

Fig. 3 is a transverse vertical section on the line 3—3 of Fig. 1;

Fig. 4 is a view similar to Fig. 1 but showing a different form of housing construction;

Fig. 5 is a side elevation of a set of grinding disks, embodying a construction that is a modification of the disks illustrated in Figs. 1 to 4;

Fig. 6 is a section on the line 6—6 of Fig. 5; and

Fig. 7 is a section on the line 7—7 of Fig. 5.

Referring to Figs. 1 to 3, the housing consists of a cylindrical structure, preferably arranged with its axis horizontal and comprising the lower section 10 and the upper section 11, these sections having flanges 12 and 13, respectively, which are clamped together by bolts 14. The end walls of the housing are formed with bearings 15 and 16 in which a shaft 17 is rotatably mounted, this shaft being of non-circular form between these bearings and, in the drawings, is shown as square, although it is, obviously, not essential that the shaft be square, as any other non-circular shape, providing the flattened surfaces, as hereinafter described, may be used.

Welded or otherwise secured on the exterior of the housing member 10 and 11, are the substantially semi-cylindrical members 18 and 19 which are spaced from the exterior of the housing members to provide water spaces 20 and 21. Pipes 22 and 23 connect with the members 18 and 19 and are connected to a common water supply pipe 24 for the purpose of supplying water to the jacket spaces 20 and 21 to cool the mill. Discharge pipes 25 and 26 should be provided for carrying off the water from these jacket spaces.

The inner surface of the housing is of cylindrical form and concentric to the axis of the shaft 17, as shown at 27. Arranged on the squared portion of the shaft 17, there are sets of grinding disks which are nested together in pairs, each pair consisting of the disks 28 and 29, the peripheries of which are so shaped as to not conform to the curvature of the inner surface 27 and, in practice, I prefer to form the peripheries of the disks as arcs of circles having a lesser diameter than the interior of the housing. This is clearly shown in Fig. 3. Each disk is provided with a radial slot 30, the sides of which engage with opposite sides of the shaft 17 so as to cause the disks to be rotated with the shaft and, at the same time, permit them to move radially so as to be pressed against the surface 27 by the centrifugal forces to which the disks are subjected when rotating. From Fig. 3, it will be noted that the disks of each pair are adapted to move in opposite radial directions so that each disk tends to counterbalance its mate. It will also be noted that the successive pairs of disks have their slots 30 arranged at right angles so that the disks of one pair engage diametrically opposite points on the surface 27 and the disks of the adjoining pair, or pairs, engage the surface 27 at points spaced 90° from the first.

A pipe for feeding the material, to be ground, is indicated at 31 and a discharge pipe for the ground material is indicated at 32, this discharge pipe being at the opposite end of the housing from the pipe 31, so that the material, in being worked, moves from one end of the housing to the other and is, therefore, acted upon by the several pairs of disks, in succession. To assist in movement of the material through the housing, the disks are preferably provided with helically arranged grooves 33 in the portions of their peripheries, which engage with the surface 27. The inclination of the grooves 33 depends upon the rotation of the disks and should be such as to assist in moving the material toward the discharge pipe 32.

In the operation of the mill, the shaft 17 will be rotated by means of a pulley or other form of drive, from a suitable source of power and the centrifugal forces acting on the different disks, cause them to be forcibly pressed against the surface 27. The curvature of the peripheries of the disks, being on a smaller radius than the surface 27, provides spaces for the entrance of the material into the paths of the successive disks and the material is ground by the rubbing action of the disks on it and the pressure of the disks against the housing. The mill is adapted to grind the material either in dry form or when wet with a suitable liquid, such as water or any of the usual forms of oil in which it is customary to grind materials of the kinds mentioned.

The circulation of the water through the jacket spaces 20 and 21 assures suitable cooling of the mill while in operation, if the conditions under which it is operated, make cooling necessary.

The form of the invention illustrated in Fig. 4 is similar to that illustrated in Figs. 1 to 3, with the exception that the main part of the housing is in the form of a cylinder 34, the ends of which are closed by the plates 35 and 36 which may be secured in position by means of the bolts 37 or in any other suitable manner. The plates 35 and 36 are preferably provided with feet or bases 38 by means of which the mill is supported, these feet or bases also being adapted to be bolted to a suitable foundation. The supply pipe for the material is indicated at 39 and the discharge pipe at 40. The shaft 17 is supported in the bearings 41 and 42 in the end plates 35 and 36, respectively. The operation of this form of the invention is similar to that previously described.

In Figs. 5, 6 and 7, I have illustrated a different form of disks, each set, in this instance, consisting of four nested disks 43, 44, 45 and 46, the peripheries of which are of the same width, in the axial direction, and all travel in the same circumferential path. Each of the disks is provided with a slot to receive the squared shaft and the disks 43 and 44 move radially, in opposite directions, in one radial plane, whereas the disks 45 and 46 move in opposite directions in a radial plane that is at right angles to the plane of radial movement of the disks 43 and 44. By this arrangement, the slots in the disks 43 and 44 engage with two of the opposite sides of the shaft 17, whereas the disks 45 and 46 engage with the other two sides of said shaft.

While I have described and illustrated what I now consider to be the preferred constructional forms of my invention, it is apparent that various changes may be made in the details of construction without departing from the spirit of the invention as defined in the appended claims.

Having thus described my invention, what I claim is:

1. In grinding mills, the combination of a housing, a shaft extending therethrough, a plurality of disks connected with said shaft to rotate therewith and having radially extending slots permitting the disks to move radially of the shaft under the influence of centrifugal force to press against the interior of the housing, said disks being arranged in pairs, the disks of each pair being of complementary form and so nested that their peripheries travel in the same circumferential path, means for supplying material to one end of said housing, and means for discharging the material from the opposite end of the housing.

2. In grinding mills, the combination of a housing, a shaft extending therethrough, a plurality of disks connected with said shaft to rotate therewith and having radially extending slots permitting the disks to move radially of the shaft under the influence of centrifugal force to press against the interior of the housing, said disks being arranged in pairs, the disks of each pair being of complementary form and so nested that they move in opposite radial directions and their peripheries travel in the same circumferential path, means for supplying material to one end of said housing, and means for discharging material from the opposite end of the housing.

3. In grinding mills, the combination of a housing, a shaft extending therethrough, a plurality of disks connected with said shaft to rotate therewith and having radially extending slots permitting the disks to move radially of the shaft under the influence of centrifugal force to press against the interior of the housing, said disks being arranged in pairs, the disks of each pair being of complementary form and so nested that they move in opposite radial directions and their peripheries travel in the same circumferential path, adjoining pairs of disks being arranged to move radially in different radial planes, means for supplying material to one end of said housing, and means for discharging material from the opposite end of the housing.

4. In grinding mills, the combination of a housing, a shaft extending therethrough and having flattened opposite sides within the housing, a plurality of disks arranged side-by-side within said housing and having radial slots the sides of which engage the flattened sides of said shaft whereby the disks are caused to rotate with the shaft but are movable radially thereof under the influence of centrifugal force to press against the inner surface of said housing, means for supplying material to one end of said housing, and means for discharging material from the opposite end of said housing.

5. In grinding mills, the combination of a housing, a shaft extending therethrough and having flattened opposite sides within the housing, a plurality of disks arranged side-by-side within said housing and having radial slots the sides of which engage the flattened sides of said shaft whereby the disks are caused to rotate with the shaft but are movable radially thereof under the influence of centrifugal force to press against the inner surface of said housing, the peripheries of said disks being so shaped as to not conform to the curvature of the inner surface of said housing, means for supplying material to one end of said housing, and means for discharging material from the opposite end of the housing.

6. In grinding mills, the combination of a housing, a shaft extending therethrough and having flattened opposite sides within the housing, a plurality of disks arranged side-by-side within said housing and having radial slots the sides of which engage the flattened sides of said shaft whereby the disks are caused to rotate with the shaft but are movable radially thereof under the influence of centrifugal force to press against the inner surface of said housing, the peripheries of said disks being so shaped as to not conform to the curvature of the inner surface of said housing and having helical grooves adapted to assist in moving the material axially of said shaft, means for supplying material to one end of said housing and means for discharging material from the opposite end of the housing.

7. In grinding mills, the combination of a housing, a shaft extending therethrough and having flattened opposite sides within the housing, a plurality of sets of disks arranged side-by-side within said housing and having radial slots the sides of which engage the flattened sides of said shaft whereby the disks are caused to rotate with the shaft but are movable radially thereof, each set of said disks comprising a plurality of independently movable disks which are movable in different radial planes and are so nested that their peripheries travel in the same circumferential path, means for supplying material to one end of said housing, and means for discharging material from the opposite end of the housing.

In testimony whereof, I hereunto affix my signature.

RUSSELL SHEPHEARD.